Patented Nov. 20, 1945

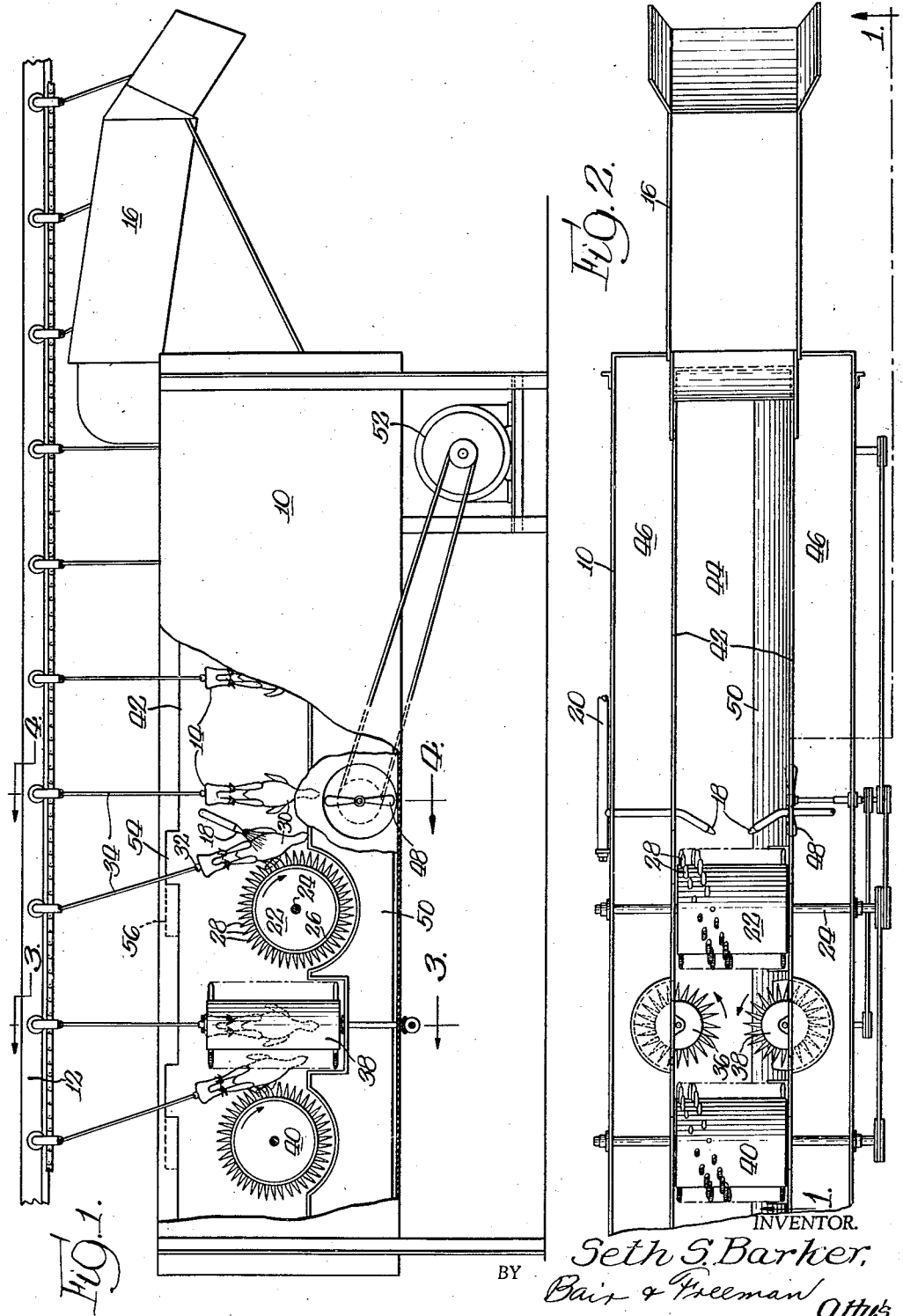

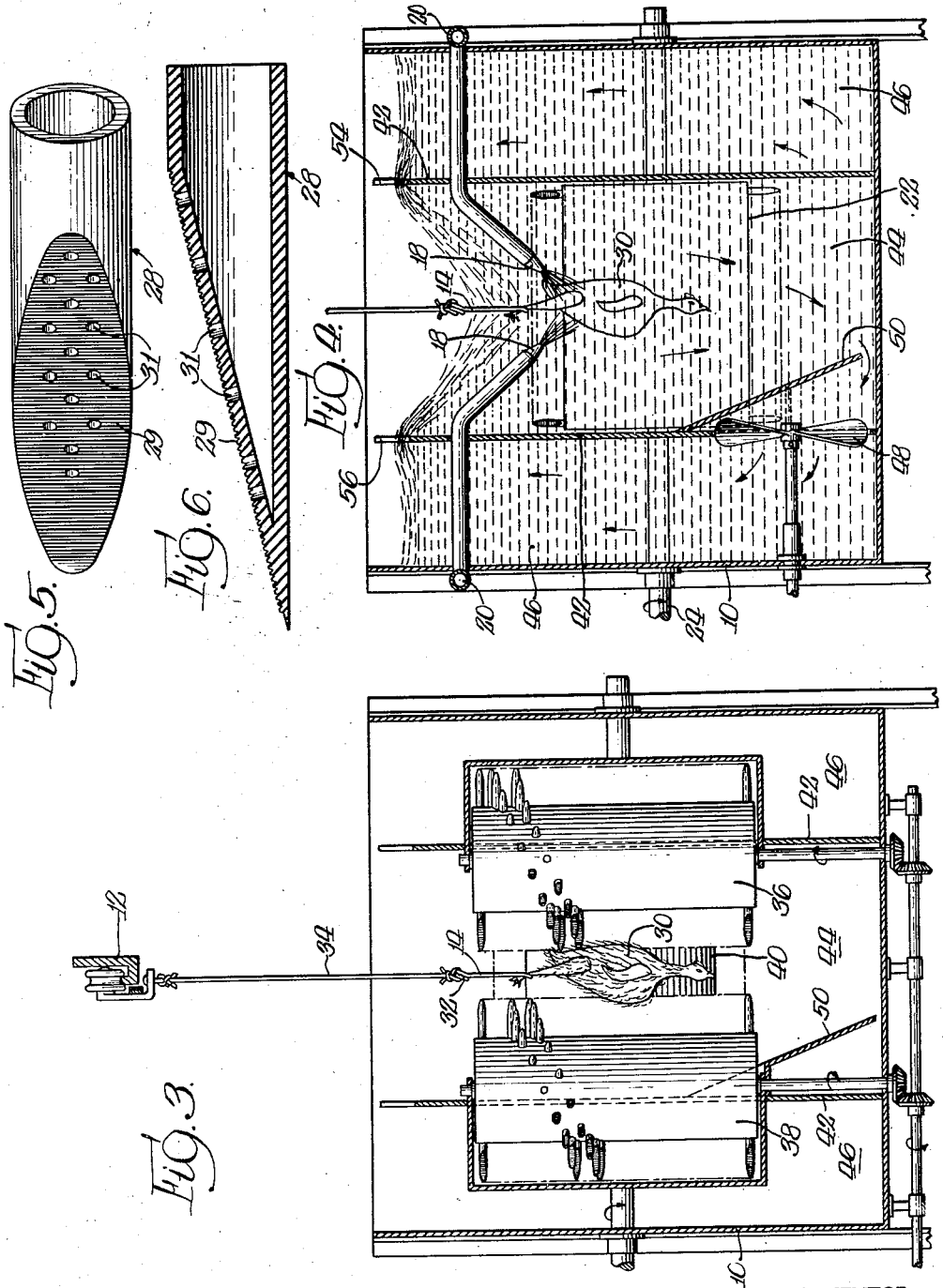

2,389,404

UNITED STATES PATENT OFFICE 2,389,404

METHOD OF AND APPARATUS FOR DEFEATHERING FOWLS

Seth S. Barker, Ottumwa, Iowa

Application September 5, 1940, Serial No. 355,415

23 Claims. (Cl. 17—11.1)

It is an object of my invention to provide a process for defeathering fowls, and further, to provide apparatus suitable for carrying out the process.

More particularly, it is an object to provide a process for defeathering fowls whereby the fowls are picked cleanly, and by which they are left in good condition for display or for cold storage.

With regard to the apparatus which is the subject of my invention, it is an object to provide means for automatically handling birds by mechanical means, to avoid the expense and uneven results of hand picking methods. It is further an object to provide an apparatus by which the fowls are held against rotary picking means by a current of water, so that the resilience of the water current will serve to hold them in yielding engagement whereby all parts of the fowl are thoroughly picked.

Briefly, the particular structure in which my invention is exemplified in the drawings and description consists of a hot water bath, preferably a semi-scalding bath, in which the fowls are first immersed, and a plurality of picking rotors having flexible or resilient projections, against which the fowls are subsequently moved by an overhead conveyor, together with means for directing a strong current of water onto the birds in such a manner as to hold them against the picking rotors as they pass.

In the accompanying drawings

Figure 1 is a side view partly in vertical section showing a machine embodying my invention and which may be employed for carrying out my process.

Figure 2 is a plan view of the same.

Figure 3 is a vertical sectional view taken on the line 3—3 of Figure 1.

Figure 4 is a vertical sectional view taken on the line 4—4 of Figure 1.

Figure 5 is a perspective view of a flexible picking finger.

Figure 6 is a longitudinal sectional view through the device of Figure 5.

In the accompanying drawings I have used the reference numeral 10 to indicate generally an elongated tank or similar container. Reference numeral 12 indicates generally an overhead conveyor passing above the tank and provided with shackles 14 in which chickens or other fowls can be supported in inverted position. The conveyor moves from right to left, as viewed in Figure 1, so that the fowls are drawn up the intake chute 16 and dropped into the tank 10. In the tank 10 I provide a plurality of jets 18 connected with suitable water supply pipes 20. The jets 18 are supplied with water at high pressure, and the jets are so located that streams of water are directed from them downwardly against the fowl, and by the application of sufficient pressure it is possible to remove the feathers from the fowl solely by the force of the streams of water. Under certain conditions and with certain birds, removal of feathers by the method and apparatus above described will be satisfactory. I have found, however, that for many practical purposes the results obtained may be improved by combining the use of water pressure with the action of picking rotors consisting of a number of flexible elements or fingers projecting from a rotatable cylinder.

In the exemplification shown in the drawings, a plurality of picking rotors is indicated. The first of these, indicated as 22, rotates on a horizontal shaft 24 extending transversely of the tank 10, and consists of a cylindrical drum 26 mounted on the shaft, and carrying a number of radially projecting fingers 28. These fingers may be made of various materials and in various ways to accomplish the desired result, depending upon the degree of water pressure which is used, and the treatment which the fowls have received preparatory to being engaged by the picking rotor. However, it has been found that a practical and effective picking finger may be made in the form shown in Figures 5 and 6. Soft rubber is a suitable material, and the finger is made in the form of a cylinder cut off by an inclined plane. The plane surface is provided with transverse ribs or corrugations 29. In order to save material and add to the flexibility of the finger, it may be made hollow, as shown in the sectional view of Figure 6. Holes 31 may be provided, if desired, so that the suction apparatus described in Swanson Patent No. 1,889,228, November 29, 1932, can be used. This is optional, however, and not material to the present purpose.

The transverse ribs give a gripping effect which pulls feathers efficiently, and the plane surface, extending the full width of the finger, covers a wide area of the body of the fowl. The tapered shape resulting from the inclined relation of the plane to the axis of the cylinder causes the finger to bend evenly along its length to conform to the surface, as the finger passes over the body of the fowl. A finger of uniform cylindrical shape, for example, is likely to buckle at some mid point along its length when it strikes the fowl, and thus not conform closely to the body of the fowl.

In mounting the flexible fingers on the drum it is advisable to arrange them in spiral relation, as seen in Figure 2, so that when the fowl 30 comes in contact with the moving fingers 28, as in Figure 1, the spiral action of the fingers will tend, like a screw, to rotate the fowl and cause all sides of it to be engaged by the picking fingers as the fowl passes over the drum. A swivel 32 is provided in connection with each shackle 14 so that the shackle supporting chain or cord 34 will not be twisted.

In the drawings, for simplicity, only part of the picking fingers on the rotors are shown, two typical spiral rows being shown in the elevational views of the rotors in Figures 2 and 3. In actual practice, of course, the entire length of the rotors is occupied with similar rows of picking fingers, as indicated by the dot and dash lines in the drawings.

It will be seen in Figure 1 that the stream of water from the jet 18 holds the fowl 30 against the picking rotor 22. The rotor turns in the direction indicated by the arrow, thus keeping the cord 34 tight, as the fowl is drawn over the rotor. The combination of the force of water from the jet 18 and the stripping action of the fingers 28 on the picking rotor cleans the feathers from the fowl. In addition to the rotor 22 it may sometimes be advisable to provide vertical rotors such as 36 and 38. These rotors are of sufficient length in a vertical direction so that they can engage all parts of the fowl, and they are preferably driven, as indicated by the arrows in Figure 2, in such directions that the fowl is rapidly rotated on the swivel 32 when it passes between the rotors, thus all sides along the whole length of the fowl will be engaged by the fingers of the rotors.

In some cases it may be desirable to provide more than one horizontal rotor, the rotors being located at different levels. Thus in Figure 1 it will be noted that the rotor 22 will operate most effectively on the portion of the fowl's body nearest the neck, whereas the rotor 40 operates more effectively upon the portions nearest the legs. The jets 18 have been shown in the drawings only in connection with the rotor 22, but it will be obvious that they may be provided for the other rotors if so desired.

The maximum effectiveness of my process and apparatus results when the defeathering process includes a scalding operation. In the apparatus shown in the drawings this is most conveniently accomplished by maintaining water in the tank 10 at the desired temperature. For the so-called semi-scald method this temperature will be about 130° F. The fowls after they are drawn up the chute 16 are dropped into the hot water, and passed through the water bath for a period which may be controlled by regulating the speed of the conveyor, before they are engaged by the rotors and by the high velocity streams of water from the jets.

I preferably arrange the interior of the tank 10 in a manner which facilitates both the scalding and the picking phases of the defeathering operation. I refer to the inner walls 42 by which the space within the tank is, in effect, divided into a central chamber 44 and side chambers 46. The side chambers 46 are interconnected at the ends of the tank by passageways which are not shown in the drawings. By means of a propeller 48 water is drawn from the central chamber 44 under the baffle plate 50 into the side chambers 46. The excess water in the side chambers overflows the inner walls 42 to return to the central chamber 44. The result is a strong downward current of water in the central chamber 44. The lay of the feathers on a fowl is toward the tail and it will thus be seen that when the fowls are supported in the central chamber by their feet, the water current described will be in a direction against the lay of the feathers, so that water will penetrate fully into all parts of the feathers to the skin of the fowl.

When the fowls reach the picking rotors, the downward current of water described tends to hold them down against the horizontal rotors 22 and 40 as they are dragged across by the conveyor. In the case of the vertical rotors 36 and 38, the downward current serves to keep the fowl submerged, thus overcoming any tendency which the fowl might have to rise to the surface and thus escape the action of the picking fingers on the rotor.

The picking rotors and the propeller 48 may all be driven by suitable belts and pulleys from a motor 52.

Performance of the picking operation under water has a number of distinct advantages. One is that there is much less tendency to scuff or bark the fowl, as sometimes happens in dry picking machines. Consequently the fowls picked by my process are in much nicer shape for storage, display and sale. A further advantage lies in the fact that the water keeps the picking rotors cleaned of feathers, and this solves a very practical problem. Feathers slip on feathers without much friction, so when the rotor of a dry picker becomes covered with adhering feathers, its efficiency for picking more feathers is seriously impaired. Where my circulating water system is used, the feathers are quickly removed from the vicinity of the rotors, and can be strained from the circulating stream by any suitable means, not shown in the drawings.

The circulating water may be utilized to perform another function which increases the thoroughness of picking. In Figure 1 is shown an upwardly projecting portion 54 of one of the inner walls 42, being the inner wall at the right in Figure 4. The portion 54 serves as a dam or stop on one wall to prevent water from flowing over it at that place. The corresponding portion of the opposite inner wall (i. e., the one at the left in Figure 4) has a similar upward projection 56, but it is offset from 54 in the direction of travel of the fowls. The approximate relative position of 56 with respect to 54 is shown in Figure 1, where the outline of the projection 56 is indicated by dotted lines.

As a result of the location of the "dams" described, a fowl just moving into contact with the rotor 22 (as in Figure 1) is subject to a current of water coming largely from the left side (as seen in Figure 4). As the fowl is dragged by the conveyor toward the top of the rotating drum, the predominance of the current changes from the left side to the right side. There results an oscillating or swinging movement of the fowl about its flexible support which causes it to roll on the drum, and so to expose various portions to contact with the picking fingers.

A similar arrangement can be provided on the walls 42 in the vicinity of the other rotors.

The size of the projecting portions, and their relation to each other, may be varied from the particular arrangement and proportion shown in the drawings. The particular structural details are not so important, however, as the result produced, i. e., the alternation in the transverse direction of the current of water to which the fowl is subjected as it moves along. The purpose of this alternation, of course, is to secure efficient, clean picking by moving the fowl from side to side, and by thus rolling it on the picking rotor.

Some changes may be made in the construction and arrangement of the parts of my device without departing from the real spirit and purpose of my invention, and it will be understood that the apparatus shown and described constitutes only one of a number of possible means of carrying out the process of my invention. It is my intention, however, to cover by my claims any variant modes of procedure and any modified forms of structure or use of mechanical equivalents which may reasonably be included within their scope.

I claim as my invention:

1. Apparatus for defeathering fowls consisting of a tank, a conveyor over said tank, means for supporting fowls from said conveyor in inverted position, and water jets in said tank for directing streams of water at high velocity onto fowls therein, for removing feathers from said fowls.

2. Apparatus for handling fowls consisting of a conveyor, means for supporting fowls thereon, water jets in the path of said conveyor for directing streams of water at high velocity onto said fowls to partly remove the feathers therefrom, and a picking rotor in the path of said conveyor, the fowls being moved against said rotor by said conveyor for further removal of the feathers from said fowls.

3. In a poultry handling machine, means for directing a stream of water at high velocity against a fowl for partly removing feathers from the fowl, a picking rotor, and means for moving said fowl against said rotor for further removal of feathers, said means for directing a stream of water being adapted to cause said stream of water to press said fowl against said rotor.

4. A method of defeathering fowls consisting of moving the fowl across a rotating drum having projections thereon, and simultaneously directing a current of water against the fowl to hold it in engagement with the projections on the rotating drum.

5. A method of defeathering fowls consisting of hanging the fowl neck down, immersing it in a semi-scalding bath, and moving it against a picking cylinder, the fowl being subjected simultaneously to a current of water which maintains it in engagement with the picking cylinder.

6. A method of picking fowls consisting of supporting them neck down, moving them horizontally through a downwardly directed current of hot water, and moving them against a plurality of rotating pickers, the downwardly directed current of water against the fowls being continued meanwhile to keep them submerged and in contact with said pickers.

7. In apparatus for handling fowls, a moving conveyor, means for suspending a fowl from said conveyor, a tank, a rotary picking cylinder in said tank, the fowl when so suspended being drawn by said conveyor through said tank and against said cylinder, and means for circulating water in said tank to direct a strong downward current of water on the fowl to retain it submerged while against said cylinder.

8. In apparatus for handling fowls, a horizontally moving conveyor, means for suspending a fowl from said conveyor, a tank containing hot water, and a plurality of rotary picking cylinders rotating on horizontal axes at right angles to the direction of movement of said conveyor, the fowl being drawn by said conveyor through said tank and against said cylinders.

9. In a machine for defeathering fowls, means for moving a suspended bird in a horizontal direction, a picking drum rotatably mounted on an axis at right angles to the direction of movement of the bird, and means for directing a current of water on said bird to hold it against said drum while said drum is rotated.

10. In a machine for defeathering fowls, means for moving a suspended bird in a horizontal direction, a plurality of picking rotors on horizontal axes at right angles to the direction of movement of the bird, said rotors being at various vertical heights, said means for moving the bird in a horizontal direction being located to move the bird successively against said rotors, and means for directing a current of water on the bird to hold it against said rotors.

11. Apparatus for defeathering fowls consisting of a conveyor on which the fowl is suspended, a water tank through which the fowl is drawn by said conveyor, a pair of picking rotors in the tank, one on each side of the path of movement of the fowl, and means in said tank for circulating a downward current of water against the fowl to keep it submerged while passing between said rotors.

12. In defeathering apparatus, a plurality of horizontally mounted picking rotors, means for drawing a fowl across them, and means for directing a current of water against the fowl to hold it in firm engagement with the rotors.

13. In apparatus for handling fowls, a hot water tank, means for drawing a fowl through said tank, means for directing a current of water on said fowls opposite to the lay of their feathers, a horizontal picking rotor, a pair of vertical picking rotors, one on each side of the path of movement of said fowl, and a second horizontal rotor at a different height than the first.

14. The process of defeathering fowls consisting of submerging the fowls in liquid, retaining the fowls submerged by a downward current of the liquid, and removing the feathers by rubbing the body of the fowl with a plurality of flexible rubber fingers having ribs or corrugations on the working surfaces transverse to the line of motion on the body of the fowl.

15. A process of defeathering fowls consisting of submerging the fowls in liquid, and drawing them, while so submerged, into contact with a picking rotor.

16. The method of defeathering fowls consisting of submerging the fowls in liquid, drawing them, while so submerged, into contact with a picking rotor, and subjecting them, as they are drawn across the rotor, to currents in said liquid which have alternate components of motion in directions transverse to the direction in which the fowls are being drawn.

17. In apparatus for defeathering fowls, a tank for containing liquid, defeathering means therein, means for drawing fowls through said tank, inner walls in said tank, means for causing the liquid in said tank to flow over said inner walls into the space between said inner walls, and dams along the upper edges of said inner walls to prevent overflow along limited portions of said walls, said dams on opposite sides being offset or staggered along said inner walls.

18. In apparatus for handling fowls, a conveyor, a picking rotor mounted in the path of fowls hanging from said conveyor so that the fowls are drawn across said picking rotor by said conveyor, and means for directing streams of liquid having alternate components of transverse movement against the fowls as they are drawn across said rotor.

19. In apparatus for handling fowls, a hot water tank, means for drawing a fowl through said tank, means for directing a current of water on said fowls opposite to the lay of their feathers, a horizontal picking rotor, a pair of vertical picking rotors, one on each side of the path of movement of said fowl, and a second horizontal rotor, most of said rotors being driven in a direction such that the surface which engages the fowl moves in a direction opposite to that in which the fowl is advanced by said means for drawing the fowl through the tank.

20. In apparatus for defeathering fowls, the combination of a semi-scalding tank, picking means consisting of a plurality of picking rotors having flexible projections, and means for directing a strong current of water against said fowls, opposite to the lay of their feathers, while they are in engagement with said rotors.

21. A method of defeathering fowls which consists in submerging the fowls in a water bath, and directing jets of water at high velocity against the fowls while so submerged.

22. A method of picking fowls consisting of submerging the fowl in water, and moving it, while so submerged, into engagement with picking means.

23. In apparatus for handling poultry, a moving conveyor, means for suspending a fowl therefrom, a tank containing a liquid, and picker means in said tank, said conveyor being adapted to move the fowl through said tank and into engagement with said picker means while submerged in the liquid.

SETH S. BARKER.